(12) United States Patent
Ullberg

(10) Patent No.: US 12,436,301 B2
(45) Date of Patent: Oct. 7, 2025

(54) READOUT CIRCUIT, RADIATION DETECTOR, IMAGING APPARATUS AND METHOD OF HANDLING INCIDENT RADIATION

(71) Applicant: VAREX IMAGING SWEDEN AB, Danderyd (SE)

(72) Inventor: Christer Ullberg, Sollentuna (SE)

(73) Assignee: VAREX IMAGING SWEDEN AB, Danderyd (SE)

( * ) Notice: Subject to any disclaimer, the term of this patent is extended or adjusted under 35 U.S.C. 154(b) by 186 days.

(21) Appl. No.: 18/336,781

(22) Filed: Jun. 16, 2023

(65) Prior Publication Data

US 2024/0061132 A1   Feb. 22, 2024

(30) Foreign Application Priority Data

Aug. 17, 2022 (SE) .................................. 2250970-7

(51) Int. Cl.
*G01T 1/24* (2006.01)

(52) U.S. Cl.
CPC ...................................... *G01T 1/24* (2013.01)

(58) Field of Classification Search
CPC ........................................................ G01T 1/24
See application file for complete search history.

(56) References Cited

U.S. PATENT DOCUMENTS

| | | | |
|---|---|---|---|
| 9,482,764 B1 | 11/2016 | Shahar et al. | |
| 9,768,785 B2 * | 9/2017 | Schultz | ............... H04N 25/57 |
| 2012/0138774 A1 * | 6/2012 | Kelly | ................. H04N 5/913 |
| | | | 250/208.1 |
| 2013/0208157 A1 * | 8/2013 | Bechtel | ............... H04N 25/583 |
| | | | 348/297 |
| 2018/0259657 A1 | 9/2018 | Fu et al. | |
| 2020/0393576 A1 | 12/2020 | Harris et al. | |

(Continued)

FOREIGN PATENT DOCUMENTS

| | | |
|---|---|---|
| EP | 3377921 A1 | 9/2018 |
| WO | 2021154851 A1 | 8/2021 |

OTHER PUBLICATIONS

EP23172736.3 Extended European Search Report dated Dec. 15, 2023. 9 pages.

(Continued)

*Primary Examiner* — Hugh Maupin
(74) *Attorney, Agent, or Firm* — Dorsey & Whitney LLP

(57) ABSTRACT

A readout circuit for a radiation detector comprising a plurality of pixels, the readout circuit being configured to handle input signals from a primary pixel with respect to the readout circuit among the plurality of pixels and comprising a charge sharing correction circuit, the charge sharing correction circuit being configured to handle a charge sharing electrical signal representative of a sum of radiation energies from a set of pixels among the plurality of pixels, the set of pixels comprising a secondary pixel with respect to the readout circuit; and a non-sharing circuit configured to handle a primary electrical signal associated with the primary pixel simultaneously with the handling of the charge sharing electrical signal by the charge sharing correction circuit, the primary electrical signal being representative of radiation energy from the primary pixel.

19 Claims, 9 Drawing Sheets

(56) References Cited

U.S. PATENT DOCUMENTS

| | | |
|---|---|---|
| 2021/0186440 A1 | 6/2021 | Kreisler et al. |
| 2022/0187477 A1* | 6/2022 | Steadman Booker .. G01T 1/171 |
| 2023/0121928 A1* | 4/2023 | Kelly ..................... H04N 25/46 |
| | | 348/218.1 |
| 2023/0138853 A1* | 5/2023 | Taguchi ................ G01T 1/2985 |
| | | 250/369 |

OTHER PUBLICATIONS

Llopart et al. Medipix2, a 64k pixel readout chip with 55 /spl mu/m square elements working in single photon counting mode. Year: 2001. 5 pages.

* cited by examiner

A-A

READOUT CIRCUIT, RADIATION DETECTOR, IMAGING APPARATUS AND METHOD OF HANDLING INCIDENT RADIATION

CROSS REFERENCE TO RELATED APPLICATIONS

This claims priority to Swedish Patent Application No. 2250970-7, filed 17 Aug. 2022 and entitled, "READOUT CIRCUIT, RADIATION DETECTOR, IMAGING APPARATUS AND METHOD OF HANDLING INCIDENT RADIATION," the entire content of which is hereby incorporated by reference.

BACKGROUND

Various radiation detectors for detecting ionizing radiation are known in the art. A radiation source transmits radiation through an object, such as a patient, and the radiation detector measures the attenuated radiation. The radiation is converted to an electrical signal, a control system processes these signals and the desired images can be provided.

For a radiation detector comprising a plurality of pixels, pulses can be summed over local pixel clusters. In this way, a risk for double counting photons which share charge between pixels can be reduced. The sum may be compared with one or more energy thresholds and the hit (and energy) may be accorded to the pixel with the greatest energy deposit. This technology is referred to as charge sharing correction. One example of such charge sharing correction is described in Reference 1, incorporated herein by reference.
Reference 1: "Medipix2, a 64 k pixel read out chip with 55 μm square elements working in single photon counting mode"; X. Llopart, M. Campbell, D. San Segundo, E. Pernigotti, R. Dinapoli; IEEE 2002 0-7803-7324-3/02.

DETAILED DESCRIPTION

Figure 1:
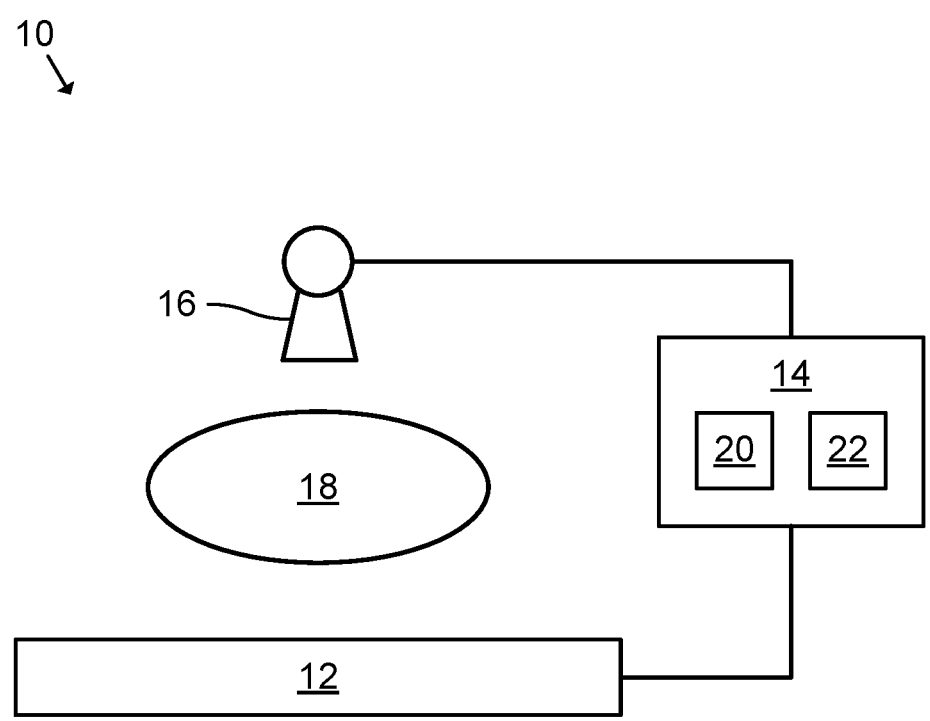
FIG. 1: schematically represents an imaging apparatus comprising a radiation detector.

In the following, a readout circuit for a radiation detector, a radiation detector comprising a plurality of pixels and at least one readout circuit, an imaging apparatus comprising a radiation detector and a method of handling incident radiation, will be described. The same or similar reference numerals will be used to denote the same or similar structural features.

All known prior art charge sharing correction implementations have a reduced maximum output count rate due to pulse pile-up for increased input count rates. By providing a readout circuit for a radiation detector that can simultaneously acquire single pixel counts and charge sharing correction counts, the performance of the radiation detector can be improved.

FIG. 1 schematically represents one example of an imaging apparatus 10. The imaging apparatus 10 comprises a radiation detector 12 and a control system 14. The imaging apparatus 10 may be used for computed tomography (CT) scanning.

The imaging apparatus 10 further comprises a radiation source 16, such as an X-ray tube, for emitting X-rays that are transmitted through an object 18 to be imaged, for example through the body of a patient. After transmission through the object 18, the X-rays reach the radiation detector 12 where the X-rays are detected and converted into signals representing a spatially resolved projection image of the object 18.

The control system 14 is operatively connected to the radiation detector 12. The control system 14 is configured to read radiation data from the radiation detector 12. The control system 14 may be configured to acquire 2D projection images. The acquired 2D images may be used to reconstruct, for example 3D images, of the object 18 using inter alia known principles of computed tomography.

The control system 14 comprises a data processing device 20 and a memory 22. The memory 22 has a computer program stored thereon. The computer program comprises program code which, when executed by the data processing device 20, causes the data processing device 20 to perform, or command performance of, various steps described herein.

Figure 2:
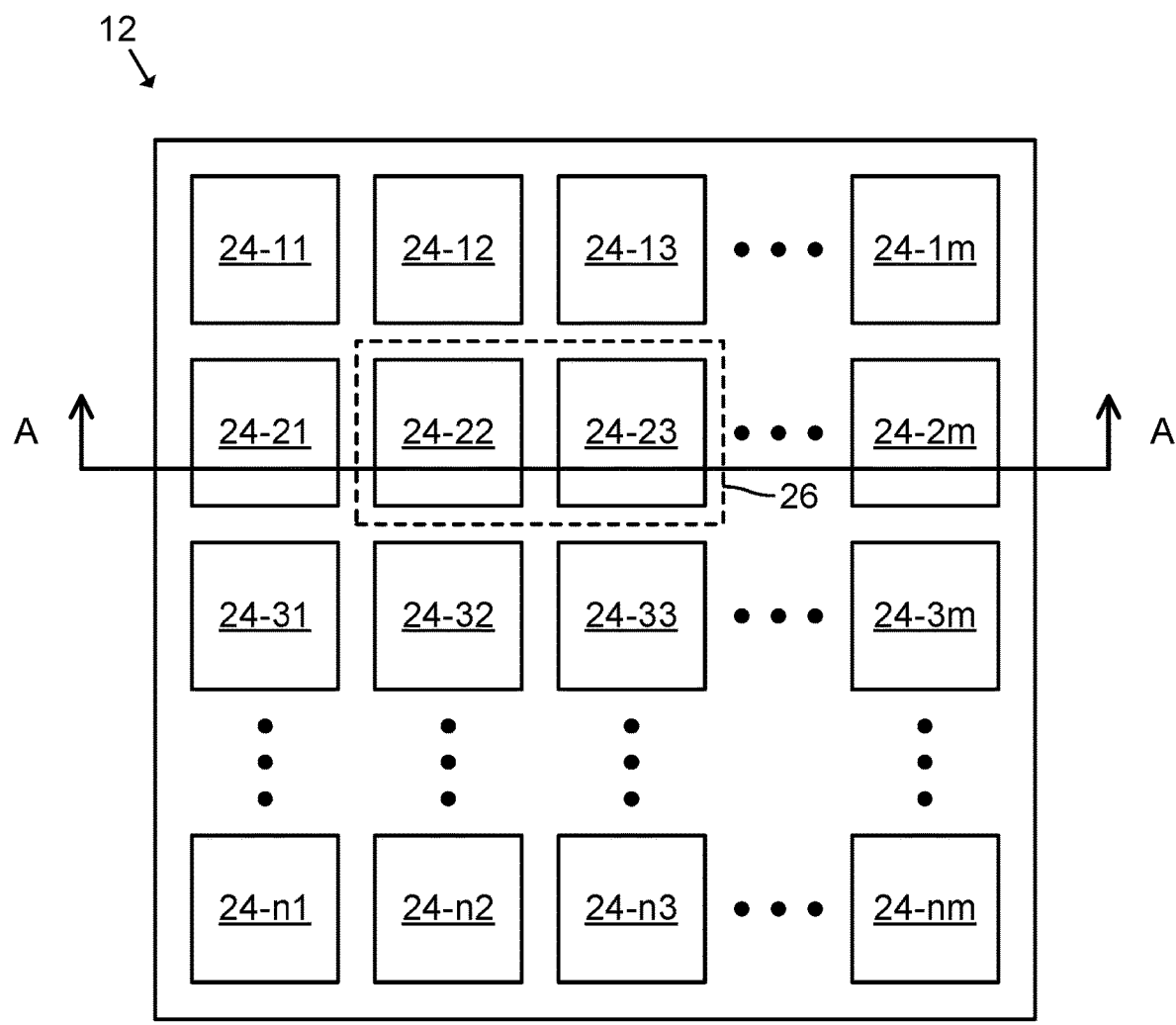
FIG. 2: schematically represents a top view of the radiation detector.

FIG. 2 schematically represents a top view of the radiation detector 12. The radiation detector 12 comprises a plurality of pixels 24-11 to 24-nm. The radiation detector 12 may for example comprise at least 1000 pixels 24-11 to 24-nm. Each pixel 24-11 to 24-nm may also be referred to with reference numeral "24". The pixels 24 are distributed over at least a major part of the radiation detector 12, such as over the entire radiation detector 12. In this example, the pixels 24 form a two-dimensional array. The radiation detector 12 comprises n rows of pixels 24 and m columns of pixels 24, where each of n and m is a positive integer.

FIG. 2 further shows a cluster or set 26 of pixels 24-22 and 24-23. In the set 26, the pixel 24-22 may be a primary pixel and the pixel 24-23 may be a secondary pixel with respect to the primary pixel 24-22. As shown in FIG. 2, the secondary pixel 24-23 is neighboring to the primary pixel 24-22. The set 26 in FIG. 2 is only one of many examples. For pixels 24 having a square shape like in FIG. 2, the set 26 may comprise one or more neighboring pixels 24 that are arranged side by side to the primary pixel 24-22 (such as the pixels 24-12, 24-21, 24-23 and 24-32) and/or one or more neighboring pixels 24 that are arranged diagonally adjacent to the primary pixel 24-22 (such as the pixels 24-11, 24-13, 24-31 and 24-33). The pixels 24 do also not need to have a square shape. Examples of alternative shapes of the pixels 24 comprise non-square rectangular shapes and hexagonal shapes.

Each pixel 24 of the radiation detector 12 may be associated with a unique set 26 of pixels 24 where that pixel 24 is a primary pixel 24 and where the other pixels 24 of that set 26 are secondary pixels 24. The sets 26 are used for charge sharing correction between pixels 24 as described herein.

Figure 3:
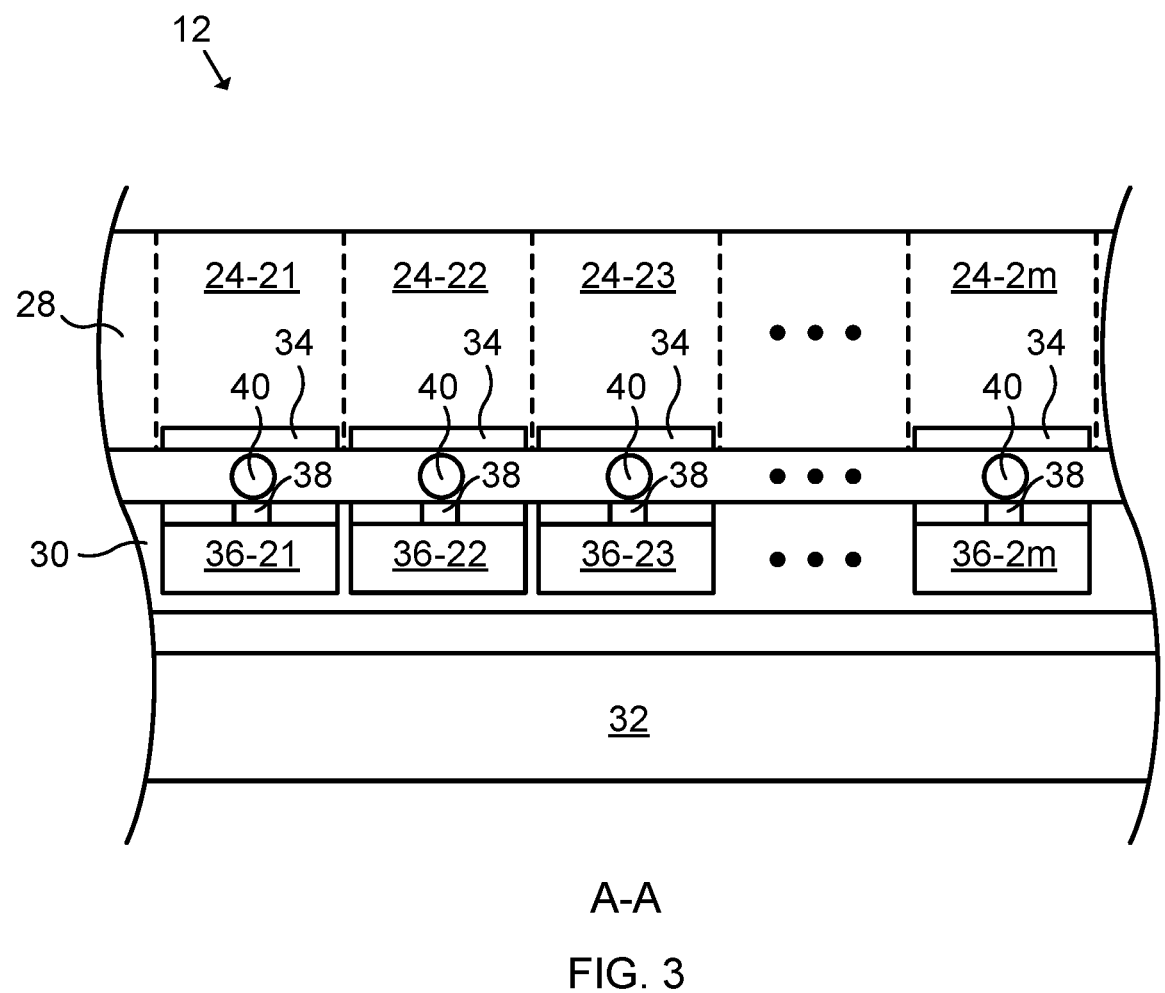
FIG. 3: schematically represents a partial cross-sectional side view of the radiation detector in section A-A in FIG. 2.

FIG. 3 schematically represents a partial cross-sectional side view of the radiation detector 12 in section A-A in FIG. 2. The radiation detector 12 comprises a conversion element 28 and a readout substrate 30, for example a readout application-specific integrated circuit (ASIC) substrate. The radiation detector 12 further comprises a support substrate 32. The pixels 24 are provided in the conversion element 28.

The conversion element 28 may be constituted by at least one semiconductor substrate, such as a cadmium telluride (CdTe) or cadmium zinc telluride (CdZnTe or CZT) substrate. The conversion element 28 may comprise a continuous conversion substrate or several discrete conversion portions.

The conversion element 28 of this example further comprises a plurality of charge collection electrodes 34, here implemented as contact pads. Each pixel 24 is defined by a charge collection electrode 34.

When X-rays (or other type of ionizing radiation) impinges on the conversion element 28, electron-hole pairs are created inside the conversion element 28 (thus the term "direct conversion") in response to the absorbed energy. Under the influence of an electric field applied across the conversion element 28, these electrons (holes) are transferred to associated charge collection electrodes 34. Thus, the conversion element 28 is configured to produce one or more charge carriers in response to incident radiation. For example, the conversion element 28 can capture and convert incident X-ray photons directly into electric charge.

The readout substrate 30 comprises a plurality of readout circuits 36-21, 36-22, and 36-23 to 36-2$m$. Each readout circuit 36-21, 36-22, and 36-23 to 36-2$m$ may also be referred to with reference numeral "36". Each readout circuit 36 comprises a readout electrode 38, here implemented as a contact pad. The radiation detector 12 comprises one readout circuit 36 associated with each pixel 24.

The radiation detector 12 further comprises a plurality of interconnections 40. Each pair of one pixel 24 and one readout circuit 36 is connected by means of an interconnection 40. In FIG. 2, the interconnections 40 are exemplified as solder bumps between the charge collection electrodes 34 and the associated readout electrodes 38. Each readout electrode 38 thereby acts as the input to the associated readout circuit 36. Other types of interconnections 40 are however conceivable.

Each readout circuit 36 comprises electronics with functions specific for the associated pixel 24. The readout circuits 36 are arranged to process signals generated by the radiation incident on the conversion element 28.

Figure 4:
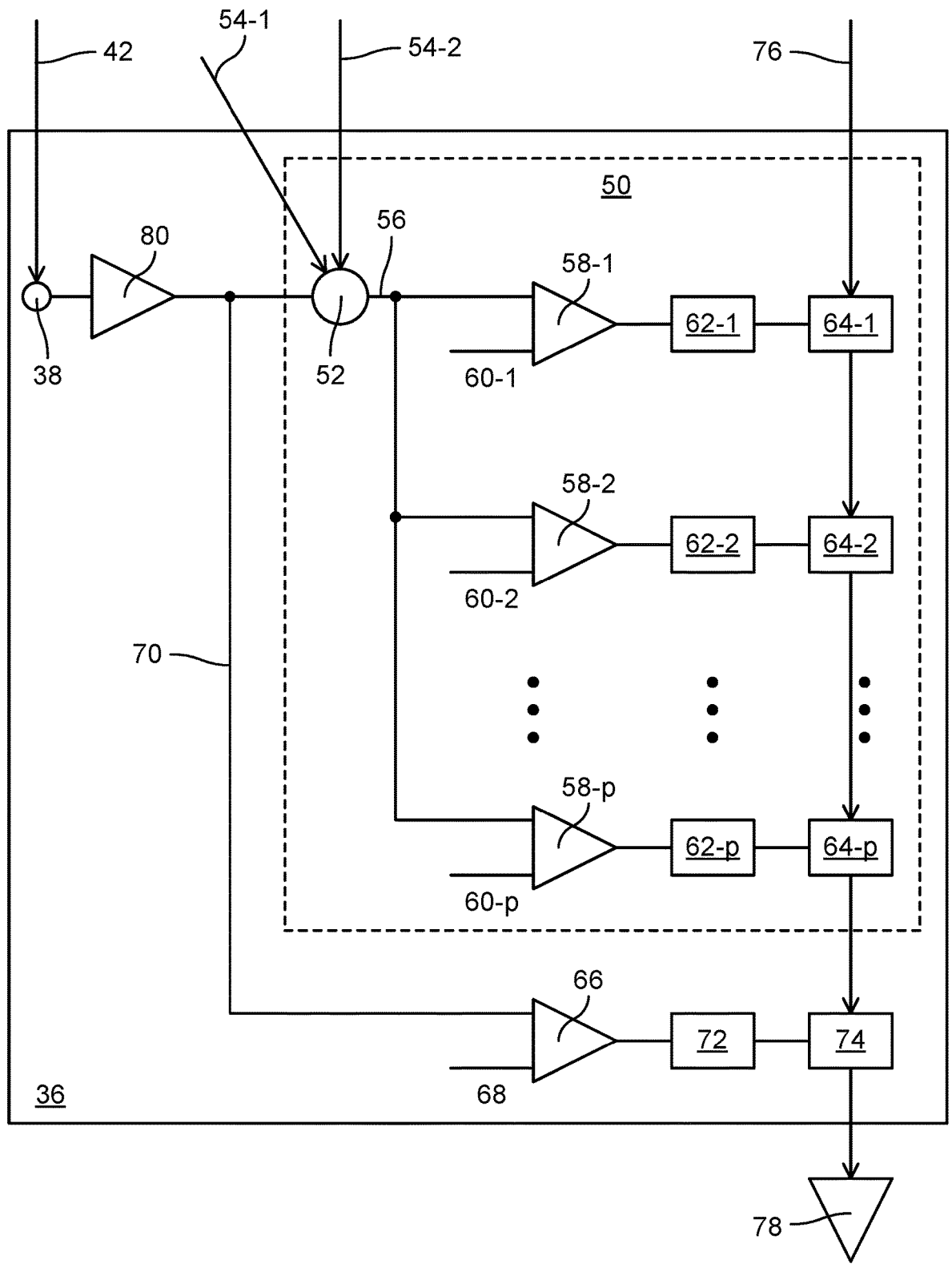
FIG. 4: schematically represents a readout circuit of the radiation detector.

FIG. 4 schematically represents one of the readout circuits 36 of the radiation detector 12. As illustrated, the readout electrode 38 receives an electrical input signal 42 from the associated pixel 24. The pixel 24 from which the readout circuit 36 receives the input signal 42 is a primary pixel 24 with respect to the readout circuit 36. The radiation detector 12 may for example comprise at least 1000 pixels 24 and a readout circuit 36 according to FIG. 4 associated with each pixel 24. The readout circuit 36 is configured to handle the input signals 42 from the primary pixel 24 with respect to the readout circuit 36. The readout circuit 36 is also configured to handle input signals 42 (or signals derived therefrom) from one or more secondary pixels 24 with respect to the readout circuit 36 within the set 26 as described below.

The readout circuit 36 of this example comprises a charge sensitive amplifier 80. The charge sensitive amplifier 80 is configured to receive and amplify the input signal 42 from the primary pixel 24 associated with the readout circuit 36 and to output a primary electrical signal 70.

The readout circuit 36 further comprises a charge sharing correction section 50. The charge sharing correction section 50 performs a charge sharing correction function and handles events between different pixels 24.

The charge sharing correction section 50 comprises a summer 52. The summer 52 sums the primary electrical signal 70 from the primary pixel 24 with respect to the readout circuit 36 and one or more input primary electrical signals 54-1 and 54-2 from respective secondary pixels 24 with respect to the primary pixel 24, such as secondary pixels 24 neighboring to the primary pixel 24. Each input primary electrical signal 54-1 and 54-2 may also be referred to with reference numeral "54". The summer 52 outputs a charge sharing electrical signal 56.

The charge sharing correction section 50 further comprises at least one sharing comparator 58. The charge sharing correction section 50 may comprise a plurality of sharing comparators, such as p sharing comparators 58-1 and 58-2 to 58-$p$, where p is a positive integer. Each sharing comparator 58-1 and 58-2 to 58-$p$ may be referred to with reference numeral "58". Each sharing comparator 58 comprises a unique sharing threshold value 60-1 and 60-2 to 60-$p$. For example, a first sharing comparator 58-1 comprises a first sharing threshold value 60-1 and a second sharing comparator 58-2 comprises a second sharing threshold value 60-2 different from the first sharing threshold value 60-1. Each sharing comparator 58 is configured to compare the charge sharing electrical signal 56 with the associated sharing threshold value 60.

The charge sharing correction section 50 further comprises one sharing counter 62 associated with each sharing comparator 58. For example, the output of each sharing comparator 58 is coupled to the input of the sharing counter 62. FIG. 4 shows p sharing counters 62-1 and 62-2 to 62-$p$. Each sharing counter 62-1 and 62-2 to 62-$p$ may also be referred to with reference numeral "62". Each sharing counter 62 counts pulses coming, either directly or indirectly, from the respective sharing comparator 58.

The charge sharing correction section 50 further comprises one sharing register 64 associated with each sharing counter 62. For example, the output of each sharing counter 62 is coupled to the input of the sharing register 64. FIG. 4 shows p sharing registers 64-1 and 64-2 to 64-$p$. Each sharing register 64-1 and 64-2 to 64-$p$ may also be referred to with reference numeral "64".

The readout circuit 36 further comprises a non-sharing comparator 66. The readout circuit 36 may optionally comprise more than one non-sharing comparator 66. The non-sharing comparator 66 comprises a non-sharing threshold value 68. In this example, the primary electrical signal 70 is sent to the non-sharing comparator 66. The primary electrical signal 70 is representative of radiation energy from only the primary pixel 24, and not from any of the secondary pixels 24 of the set 26. The non-sharing comparator 66 is configured to compare the primary electrical signal 70 with the non-sharing threshold value 68. The non-sharing threshold value 68 may be set to any value but will typically be set to a low value. Each sharing threshold value 60 may be set individually and independently of the non-sharing threshold value 68.

The readout circuit 36 further comprises a non-sharing counter 72 associated with the non-sharing comparator 66. For example, the output of the non-sharing comparator 66 is coupled to the input of the non-sharing counter 72. The non-sharing counter 72 counts pulses coming, either directly or indirectly, from the non-sharing comparator 66.

The readout circuit 36 further comprises a non-sharing register 74 associated with the non-sharing counter 72. For example, the output of the non-sharing counter 72 is coupled to the input of the non-sharing register 74. Each sharing register 64 and non-sharing register 74 is here exemplified as a shift-register.

FIG. 4 further shows a signal line 76. The readout circuit 36 receives serial data from one or more other readout circuits 36 of the radiation detector 12 via the signal line 76. Both data from the one or more sharing registers 64 and data from the non-sharing register 74 is then added to the serial data and passed on to the next readout circuit 36 and so on until serial data 78 from a last readout circuit 36 is read out.

Figure 5:
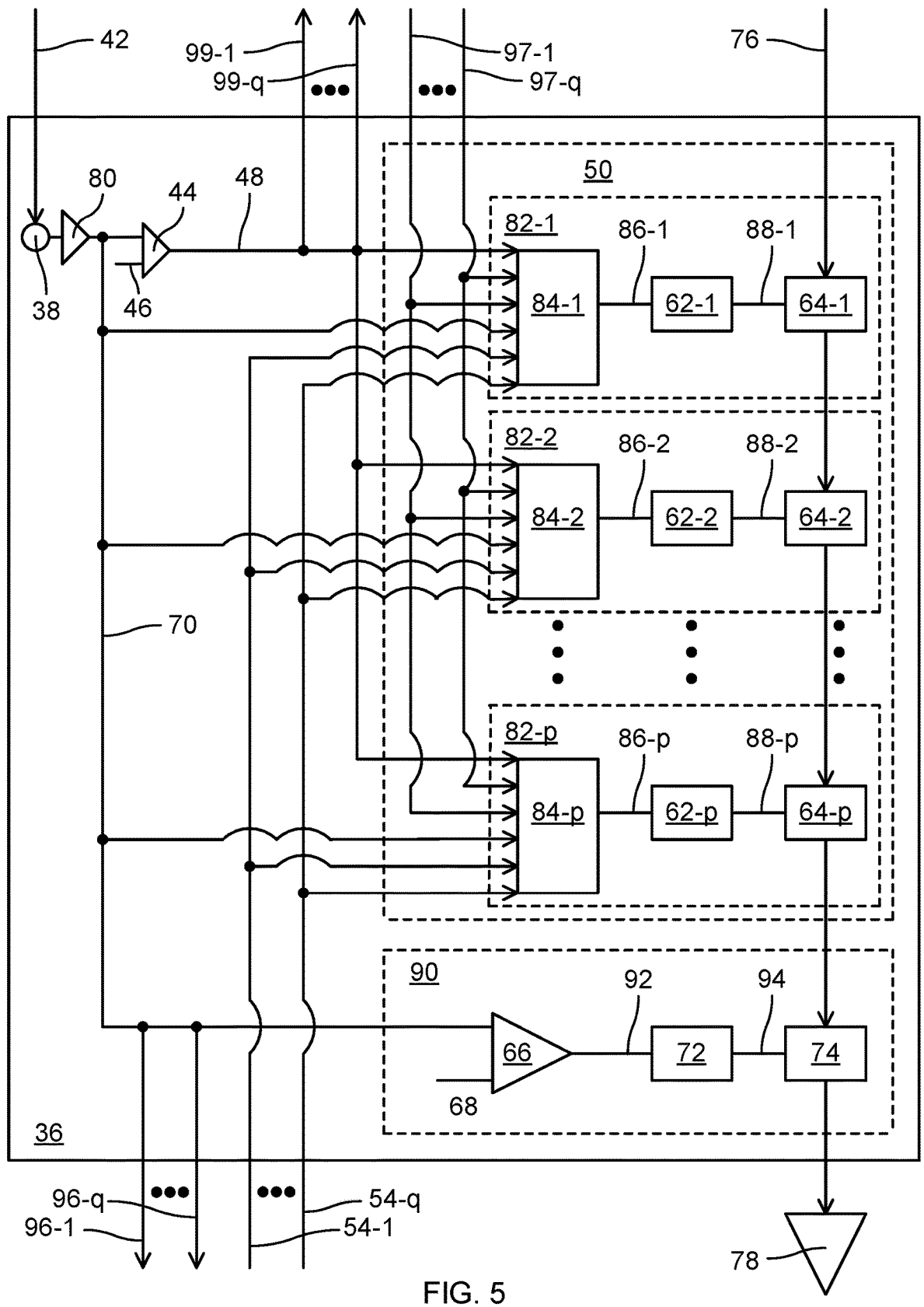
FIG. 5: schematically represents one example of a more detailed implementation of the readout circuit in FIG. 4.

FIG. 5 schematically represents one example of a more detailed implementation of the readout circuit 36 in FIG. 4. The readout circuit 36 of this example further comprises a global comparator 44. A global threshold value 46 is set in the global comparator 44. The global comparator 44 compares the input signal 42 or a signal derived from the input signal 42 with the global threshold value 46 and outputs a secondary electrical signal 48. In this example, the global comparator 44 compares the primary electrical signal 70 from the charge sensitive amplifier 80 with the global threshold value 46. The pulse length of the secondary electrical signal 48 is proportional to the charge deposited in the primary pixel 24. The global threshold value 46 may for example be set to a level slightly higher than a noise level, such as three times the noise level.

The charge sharing correction section 50 of this example comprises at least one charge sharing correction circuit 82. The charge sharing correction section 50 may comprise a plurality of charge sharing correction circuits, such as p charge sharing correction circuits 82-1 and 82-2 to 82-$p$. Each charge sharing correction circuit 82-1 and 82-2 to 82-$p$ may also be referred to with reference numeral "82". Each charge sharing correction circuit 82 is configured to handle a respective charge sharing electrical signal 56 representative of a sum of radiation energies from a set 26 of pixels 24 among the plurality of pixels 24.

Each charge sharing correction circuit 82 comprises a comparator section 84-1 and 84-2 to 84-$p$. Each comparator section 84-1 and 84-2 to 84-$p$ may also be referred to with reference numeral "84". Each comparator section 84 comprises one of the sharing comparators 58. Moreover, each charge sharing correction circuit 82 comprises one of the sharing counters 62 and one of the sharing registers 64.

Each comparator section 84 is configured to output respective sharing data 86-1 and 86-2 to 86-$p$. The sharing data 86-1 and 86-2 to 86-$p$ may also be referred to with reference numeral "86".

Each sharing counter 62 is configured to count sharing data 86 and output respective sharing counted data 88-1 and 88-2 to 88-$p$. The sharing counted data 88-1 and 88-2 to 88-$p$ may also be referred to with reference numeral "88". Each sharing register 64 is configured to receive and handle respective sharing counted data 88 from the associated sharing counter 62.

FIG. 5 further shows that the readout circuit 36 comprises a non-sharing circuit 90. The non-sharing circuit 90 comprises the non-sharing comparator 66, the non-sharing counter 72 and the non-sharing register 74. The non-sharing circuit 90 may or may not comprise additional components. The non-sharing circuit 90 is configured to handle the primary electrical signal 70 associated with only the primary pixel 24.

The non-sharing comparator 66 is configured to output non-sharing data 92. The non-sharing counter 72 is configured to count the non-sharing data 92 and output non-sharing counted data 94. The non-sharing register 74 is configured to receive and handle the non-sharing counted data 94. The sharing data 86 and the non-sharing data 92 are provided by the at least one comparator section 84 and the non-sharing comparator 66, respectively, in response to a common input signal 42.

In this example, each of the input primary electrical signals 54-1 to 54-$q$ from a secondary pixel 24 corresponds to the primary electrical signal 70 of the primary pixel 24. That is, the relationship between the primary electrical signal 70 and the primary pixel 24 corresponds to each relationship between the input primary electrical signals 54-1 to 54-$q$ and the associated secondary pixel 24.

FIG. 5 further shows that the readout circuit 36 of this example comprises at least one output primary electrical signal 96-1 to 96-$q$. The readout circuit 36 may thus comprise q output primary electrical signals where q is a positive integer. Each output primary sharing electrical signal 96-1 to 96-$q$ may also be referred to with reference numeral "96". Each output primary electrical signal 96 is here constituted by the primary electrical signal 70.

FIG. 5 further shows that the readout circuit 36 of this example comprises at least one input secondary electrical signal 97-1 to 97-$q$ and at least one output secondary electrical signal 99-1 to 99-$q$. Each input secondary electrical signal 97-1 to 97-$q$ and each output secondary electrical signal 99-1 to 99-$q$ may also be referred to with reference numerals "97" and "99", respectively.

FIG. 5 further shows that the number of input primary electrical signals 54, the number of output primary electrical signals 96, the number of input secondary electrical signals 97 and the number of output secondary electrical signals 99 may be the same. Each group of an input primary electrical signal 54, an output primary electrical signal 96, an input secondary electrical signal 97 and an output secondary electrical signal 99 may be routed between the readout circuit 36 associated with the primary pixel 24 and a readout circuit 36 associated with a secondary pixel 24 in the set 26. Each output primary electrical signal 96 outputs the primary electrical signal 70 to a secondary pixel 24 in the set 26. Each input primary electrical signal 54 inputs a primary electrical signal 70 from a secondary pixel 24 in the set 26. Each output secondary electrical signal 99 outputs the secondary electrical signal 48 to a secondary pixel 24 in the set 26. Each input secondary electrical signal 97 inputs a secondary electrical signal 48 from a secondary pixel 24 in the set 26.

Each pixel 24 of the radiation detector 12 comprises the charge sharing correction section 50 and the non-sharing circuit 90. The charge sharing correction section 50 and the non-sharing circuit 90 may as such be identical for each readout circuit 36 in the radiation detector 12. However, the charge sharing correction sections 50 are different in the sense that each charge sharing correction section 50 is in communication with a unique set 26 of pixels 24. Thus, a first charge sharing correction section 50 of a first pixel 24 receives input primary electrical signals 54 and input secondary electrical signals 97 that are different from the input primary electrical signals 54 and the input secondary electrical signals 97 to a second charge sharing correction section 50 of a different pixel 24.

Figure 6:
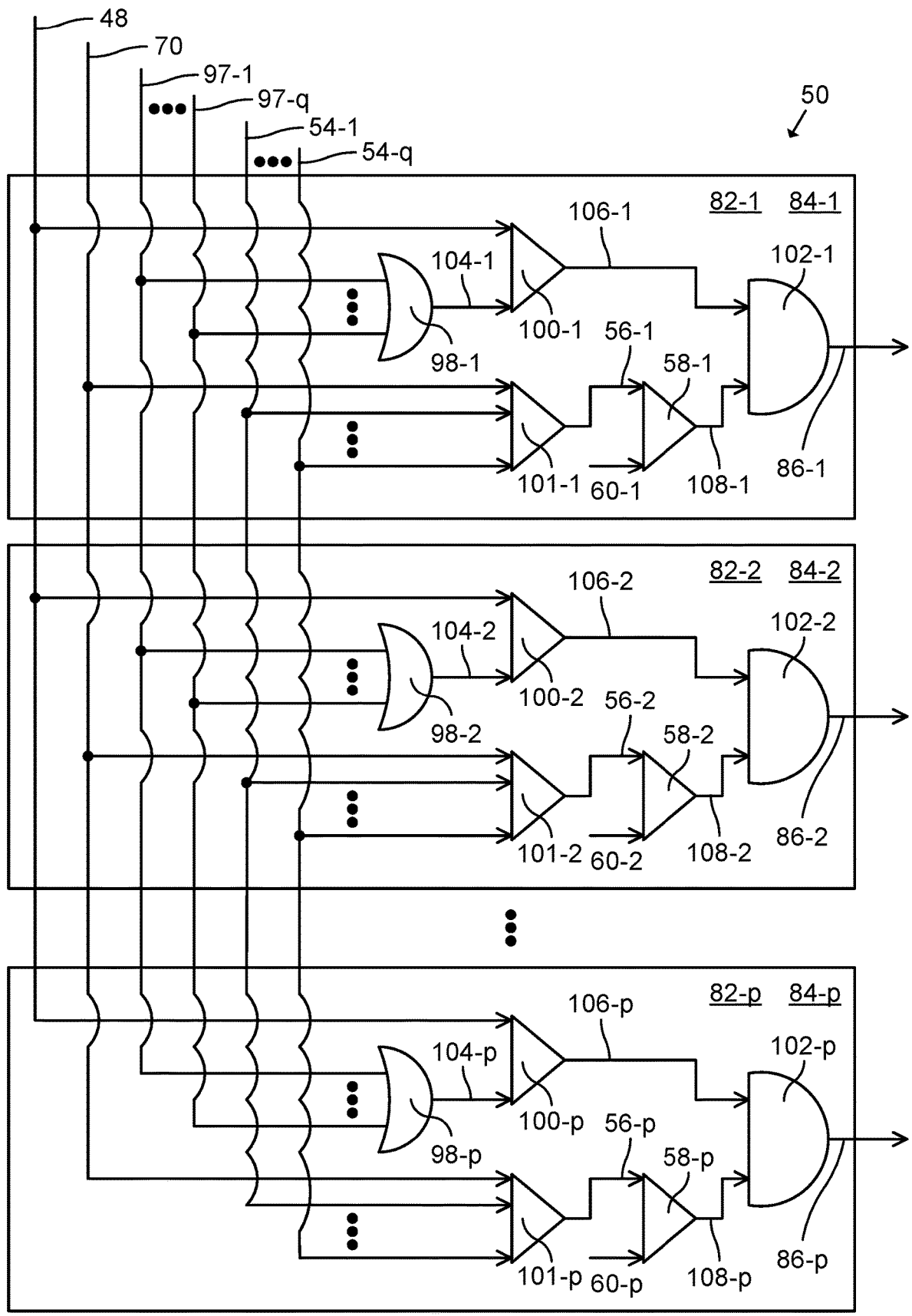
FIG. 6: schematically represents a part of a charge sharing correction section of the readout circuit.

FIG. 6 schematically represents a part of the charge sharing correction section 50. In this specific and non-limiting implementation, each comparator section 84 comprises an OR gate 98, an allocation comparator 100, a summer 101, the sharing comparator 58 and an AND gate 102. Thus, instead of a common summer 52 for the entire readout circuit 36, a summer 101 may be implemented in each comparator section 84.

In case a plurality of comparator sections 84 are used, i.e. if the readout circuit 36 comprises a plurality of charge sharing correction circuits 82, the comparator sections 84 may only differ from each other by the unique sharing threshold values 60.

In the following, a description is given for the comparator section 84-1. This description is also applicable for each further comparator section 84-2 to 84-p in the readout circuit 36.

The OR gate 98-1 is configured to receive the one or more input secondary electrical signals 97 from a readout circuit 36 of all secondary pixels 24 within the set 26. The OR gate 98-1 is configured to output an OR gate output signal 104-1.

The summer 101-1 is configured to receive the primary electrical signal 70 and the one or more input primary electrical signals 54 from a readout circuit 36 of all secondary pixels 24 within the set 26. The summer 101-1 is configured sum the input signals and to output the charge sharing electrical signal 56-1 as the sum.

The allocation comparator 100-1 is configured to receive the OR gate output signal 104-1 and to set an allocation threshold value based on the OR gate output signal 104-1. The allocation comparator 100-1 is configured to compare the secondary electrical signal 48 with the allocation threshold value and to output an allocation output signal 106-1 if the secondary electrical signal 48 is larger than the OR gate output signal 104-1.

The sharing comparator 58-1 is configured to compare the charge sharing electrical signal 56-1 with the sharing threshold value 60-1 and to output a charge sharing output signal 108-1 if the charge sharing electrical signal 56-1 is larger than the sharing threshold value 60-1.

The AND gate 102-1 is configured to output a high output as sharing data 86-1 only when both the allocation output signal 106-1 and the charge sharing output signal 108-1 are high.

In this way, the charge sharing correction circuits 82 can sum radiation energies from a single photon hit from all pixels 24 of the set 26 and allocate the sum of radiation energies only to the pixel 24 of the set 26 where the highest charge is allocated (given that this sum of radiation energies is above the respective sharing threshold value 60). Thus, an event is only counted in the pixel 24 receiving the highest charge and the level of that charge is the sum of all charges in the set 26 at the same time.

According to one variant, the one or more input secondary electrical signals 97 are input to the summer 101-1 instead of the one or more input primary electrical signals 54. Also in this way, radiation energies from a single photon hit from all pixels 24 of the set 26 can be summed. It would also be possible to utilize the output primary electrical signals 96 and the input primary electrical signals 54, but not the input secondary electrical signals 97 and the output secondary electrical signals 99, to allocate the sum of radiation energies only to the pixel 24 of the set 26 where the highest charge is allocated.

Although the charge sharing correction can provide improved energy level information from the incident radiation, each charge sharing correction circuit 82 is slower than the non-sharing circuit 90 due to pulse pile up, as detailed below. For each of the charge sharing correction circuits 82 and the non-sharing circuit 90, the pulse needs to decrease below the sharing threshold values 60 and the non-sharing threshold value 68, respectively, before a new pulse can be triggered. For a given set of sharing threshold values 60, the deadtime for the charge sharing correction circuits 82 associated with a set 26 will also generally increase with an increased number of pixels 24 in the set 26.

Due to the provision of the non-sharing circuit 90, that does not perform charge sharing correction, the readout circuit 36 can perform simultaneous acquisition of sharing counted data 88 and non-sharing counted data 94. Since the processing by the non-sharing circuit 90 is faster than the processing of the one or more charge sharing correction circuits 82, the non-sharing counted data 94 from the non-sharing circuit 90 can be used to modify the sharing counted data 88 from the one or more charge sharing correction circuits 82. Thus, all radiation detectors where a high flux may lead to pulse pile-up will benefit from this solution.

Figure 7:
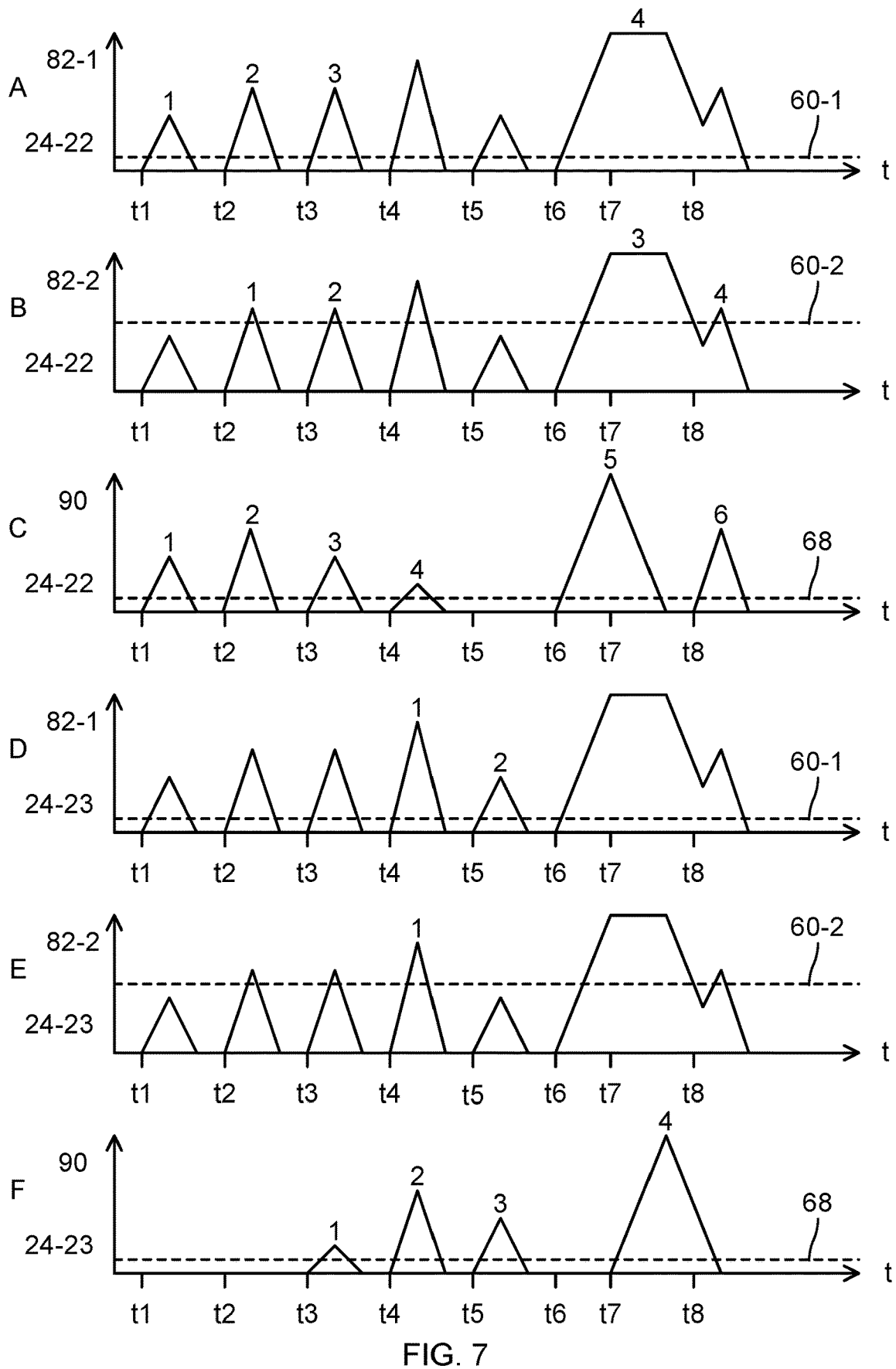
FIG. 7: schematically shows charges handled by charge sharing correction circuits and non-sharing circuits of two different readout circuits.

FIG. 7 schematically shows non-limiting examples of pulses generated by charges from incident radiation. The pulses are handled by charge sharing correction circuits 82-1 and 82-2 and non-sharing circuits 90 of two different readout circuits 36, here one readout circuit 36 associated with a first pixel 24-22 and one readout circuit 36 associated with a second pixel 24-23 of the set 26. The radiation detector 12 is configured to detect radiation repeatedly in measurement frames, where each measurement frame comprises a data acquisition period and a readout period. FIG. 7 shows counts during a data acquisition period. A readout period follows the data acquisition period. In each readout period, sharing counted data 88 from all sharing registers 64 and non-sharing counted data 94 from the non-sharing register 74 are read out simultaneously to the control system 14. A pair of a data acquisition period and a readout period forms a frame.

FIG. 7 shows six graphs A-F. Graph A shows counts by the first charge sharing correction circuit 82-1 of the first pixel 24-22 and the first sharing threshold value 60-1. Graph B shows counts by the first charge sharing correction circuit 82-2 of the first pixel 24-22 and the second sharing threshold value 60-2. Graph C shows counts by the non-sharing circuit 90 of the first pixel 24-22 and the non-sharing threshold value 68. Graph D shows counts by the first charge sharing correction circuit 82-1 of the second pixel 24-23 and the first sharing threshold value 60-1. Graph E shows counts by the second charge sharing correction circuit 82-2 of the second pixel 24-22 and the second sharing threshold value 60-2. Graph F shows counts by the non-sharing circuit 90 of the second pixel 24-22 and the non-sharing threshold value 68.

At time t1, a charge from a photon is registered in the first pixel 24-22 but not in the second pixel 24-23. Since the corresponding pulse is larger than the non-sharing threshold value 68, the non-sharing counter 72 of the first pixel 24-22 is incremented to 1, as shown in Graph C. Moreover, since a sum of the corresponding pulses in the set 26 is also larger than the first sharing threshold value 60-1, and since the pulse is largest in the first pixel 24-22, the first sharing counter 62-1 of the first pixel 24-22 is incremented to 1, as shown in Graph A.

Since no pulse is registered in the second pixel 24-23, the non-sharing counter 72 of the second pixel 24-23 is not incremented (Graph F). Moreover, although the sum of the corresponding pulses in the set 26 is larger than the first sharing threshold value 60-1, the first sharing counter 62-1 of the second pixel 24-23 is not incremented since the pulse is larger in the first pixel 24-22 than in the second pixel 24-23 (Graph D).

At time t2, a charge from a photon is registered in the first pixel 24-22 but not in the second pixel 24-23. The corresponding pulse is larger than the pulse at time t1. Since the corresponding pulse is larger than the non-sharing threshold value 68, the non-sharing counter 72 of the first pixel 24-22 is incremented to 2, as shown in Graph C. Moreover, since a sum of the corresponding pulses in the set 26 is also larger than both the first sharing threshold value 60-1 and the second sharing threshold value 60-2, and since the pulse is largest in the first pixel 24-22, the first sharing counter 62-1 of the first pixel 24-22 is incremented to 2, and the second sharing counter 62-2 of the first pixel 24-22 is incremented to 1, as shown in Graphs A and B.

At time t3, a charge from a photon is registered in each of the first pixel 24-22 and in the second pixel 24-23. The corresponding pulse is larger in the first pixel 24-22 than in the second pixel 24-23. Since the corresponding pulse is larger than the non-sharing threshold value 68 in each of the first pixel 24-22 and the second pixel 24-23, the non-sharing counter 72 of the first pixel 24-22 is incremented to 3 as shown in Graph C, and the non-sharing counter 72 of the second pixel 24-23 is incremented to 1 as shown in Graph F. Moreover, since the sum of the corresponding pulses is larger than both the first sharing threshold value 60-1 and the second sharing threshold value 60-2, and since the pulse is largest in the first pixel 24-22, the first sharing counter 62-1 of the first pixel 24-22 is incremented to 3 as shown in Graph A, and the second sharing counter 62-2 of the first pixel 24-22 is incremented to 2 as shown in Graph B.

At time t4, a charge from a photon is registered in each of the first pixel 24-22 and in the second pixel 24-23. The corresponding pulse is larger in the second pixel 24-23 than in the first pixel 24-22. Since the corresponding pulse is larger than the non-sharing threshold value 68 in each of the first pixel 24-22 and the second pixel 24-22, the non-sharing counter 72 of the first pixel 24-22 is incremented to 4 as shown in Graph C, and the non-sharing counter 72 of the second pixel 24-23 is incremented to 2 as shown in Graph F. Moreover, since the sum of the corresponding pulses is larger than both the first sharing threshold value 60-1 and the second sharing threshold value 60-2, and since the pulse is largest in the second pixel 24-23, the first sharing counter 62-1 of the second pixel 24-23 is incremented to 1 as shown in Graph D, and the second sharing counter 62-2 of the second pixel 24-23 is incremented to 1 as shown in Graph E.

At time t5, a charge from a photon is registered in the second pixel 24-23 but not in the first pixel 24-22. Since the corresponding pulse is larger than the non-sharing threshold value 68, the non-sharing counter 72 of the second pixel 24-23 is incremented to 3, as shown in Graph F. Moreover, since a sum of the corresponding pulses in the set 26 is also larger than the first sharing threshold value 60-1, and since the pulse is largest in the second pixel 24-23, the first sharing counter 62-1 of the second pixel 24-23 is incremented to 2, as shown in Graph D.

At time t6, a charge from a photon is registered in the first pixel 24-22 but not in the second pixel 24-23. Since the corresponding pulse is larger than the non-sharing threshold value 68, the non-sharing counter 72 of the first pixel 24-22 is incremented to 5, as shown in Graph C. Moreover, since a sum of the corresponding pulses in the set 26 is also larger than the first sharing threshold value 60-1 and the second sharing threshold value 60-2, and since the pulse is largest in the first pixel 24-22, the first sharing counter 62-1 of the first pixel 24-22 is incremented to 4 as shown in Graph A, and the second sharing counter 62-2 of the first pixel 24-22 is incremented to 3 as shown in Graph B.

At time t7, a charge from a photon is registered in the second pixel 24-23 but not in the first pixel 24-22. Since the corresponding pulse from the photon at time t7 is larger than the non-sharing threshold value 68, the non-sharing counter 72 of the second pixel 24-23 is incremented to 4, as shown in Graph F. However, since the charge from the photon at time t6 is still registered in the first pixel 24-22 at time t7, the summed pulse will not decrease below any of the first sharing threshold value 60-1 and the second sharing threshold value 60-2. As a consequence, none of the first sharing counter 62-1 and the second sharing counter 62-2 of the second pixel 24-23 will increment at time t7 despite the pulse being above the first and second sharing threshold values 60-1 and 60-2 and despite the pulse being larger in the second pixel 24-23 than in the first pixel 24-22. In this way, the deadtime of the charge sharing correction may cause missed information from the charge sharing correction sections 50.

At time t8, a charge from a photon is registered in the first pixel 24-22 while the pulse from t7 is still registered in the second pixel 24-23. The pulse at time t8 causes the non-sharing counter 72 of the first pixel 24-22 to increment to 6 as shown in Graph C. Moreover, since the sum of the pulse at time t7 and the pulse at time t8 slightly falls below the second sharing threshold value 60-2 and since the pulse is largest in the first pixel 24-22 at time t8, the second sharing counter 62-2 of the first pixel 24-22 is incremented to 4, as shown in Graph B. However, since the sum of the pulse at time t7 and the pulse at time t8 does not fall below the first sharing threshold value 60-1 at time t8, the first sharing counter 62-1 of the first pixel 24-22 is not incremented, although the pulse is largest in the first pixel 24-22. Also in this way, the deadtime of the charge sharing correction may cause missed information from the charge sharing correction sections 50.

Since it takes a certain time while a pulse is above a detection threshold, another pulse close in time may not always be counted. Thus, two pulses may be counted as one if closer than the deadtime.

Figure 8:
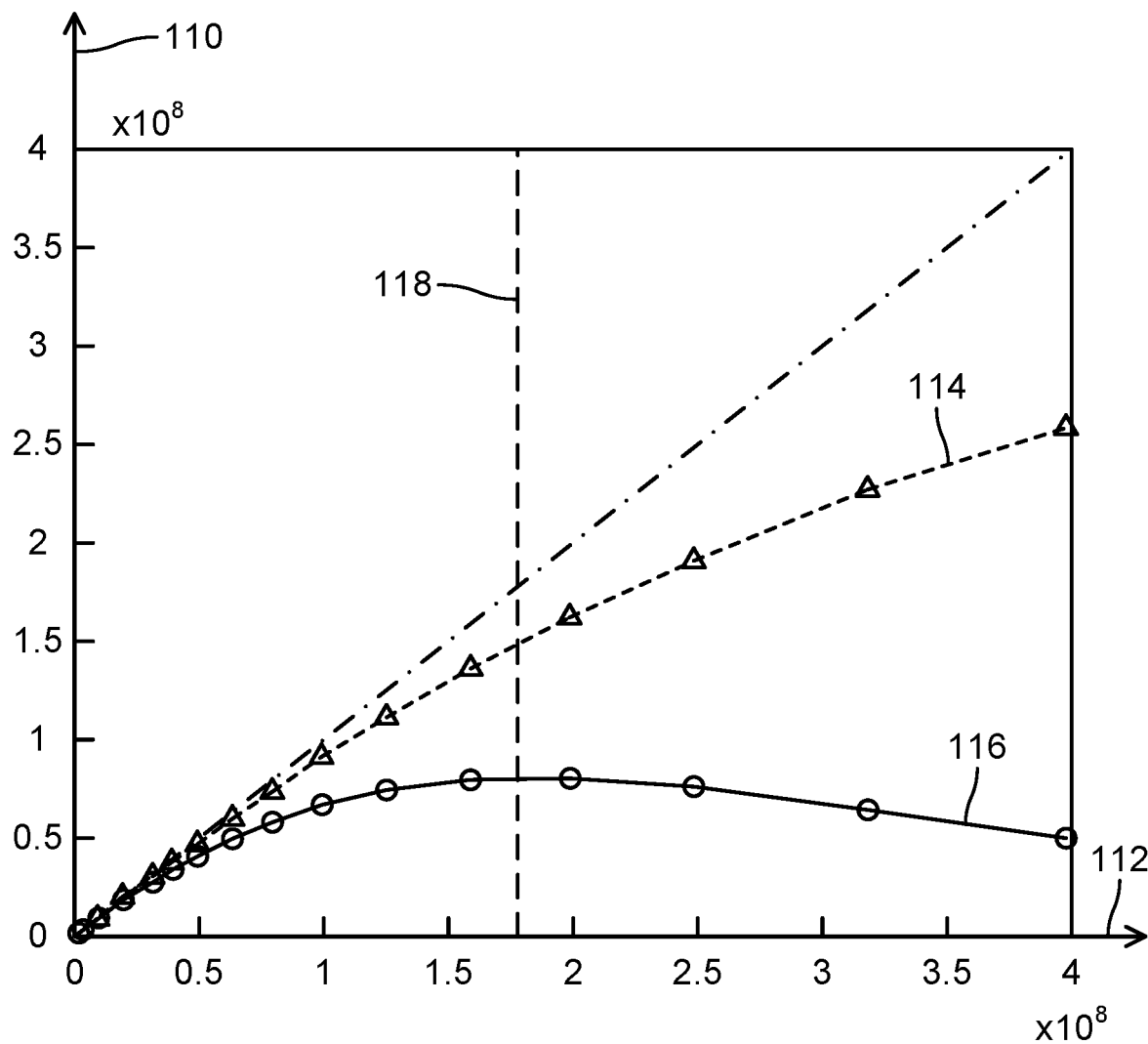
FIG. 8: schematically shows output count rates for a charge sharing correction circuit and a non-sharing circuit for different input count rates.

FIG. 8 schematically shows a specific and non-limiting example of output count rates 110 for one of the charge sharing correction circuits 82 and the non-sharing circuit 90 in a common readout circuit 36 and for different input count rates 112. The unit of the input count rate 112 and the output count rate 110 is counts/s*mm$^2$ (counts per second per square millimeter). The input count rate 112 is typically different between different pixels 24 depending on the exposure to radiation of that pixel 24. For example, the input count rate 112 of pixels 24 receiving radiation that has not interacted with the object 18 is typically substantially higher than the input count rate 112 of pixels 24 receiving radiation that has interacted with the object 18.

A non-sharing curve 114 in this specific and non-limiting example represents output count rates 110 in a non-sharing circuit 90 having a non-sharing threshold value 68 of 15 kiloelectronvolts (keV) and a simulated deadtime of 41 nanoseconds (ns). A charge sharing correction curve 116 in this specific and non-limiting example represents output count rates 110 in a charge sharing correction circuit 82 having a sharing threshold value 60 of 15 keV and a simulated deadtime of 117 ns. Although the charge sharing correction works well for low input count rates 112, saturation issues occur at lower input count rates 112 for the charge sharing correction circuit 82 than for the non-sharing circuit 90 due to the longer deadtimes of the charge sharing correction circuit 82. As shown by the charge sharing correction curve 116, the input count rate 112 may increase while the recorded events decrease.

As shown in FIG. 8, values of the output count rate 110 on the non-sharing curve 114 uniquely correspond to values of the input count rate 112 from zero to at least relatively high input count rates 112 (from zero to at least to $4*10^8$ counts/s*mm$^2$ in the specific example in FIG. 8). For the charge sharing correction curve 116 in contrast, values of the output count rate 110 uniquely correspond to values of the input count rate 112 only to substantially lower input count rates 112 (from zero to approximately $1.8*10^8$ counts/s*mm$^2$ in the specific example in FIG. 8). At input count rates 112 above approximately $1.8*10^8$ counts/s*mm$^2$, the output count rate no on the charge sharing correction curve 116 decreases for increasing input count rates 112. The reason for this is that the deadtime is longer for the charge sharing correction circuits 82 than for the non-sharing circuit 90. By determining the output count rate no based on recorded events in the non-sharing circuit 90 rather than based on recorded events in any of the charge sharing correction circuits 82, the output count rate no can be determined correctly for higher input count rates 112. A count rate threshold value 118 may be set at an input count rate 112 where the output count rate no in any of the charge sharing correction circuits 82 decrease for increasing input count rates 112. A detection of such input count rate 112 where the output count rate no in any of the charge sharing correction circuits 82 decrease for increasing input count rates 112 can be made by simulations, calculations and/or experiments. For example, with respect to FIG. 8, it can be seen that the count rate threshold value 118 is set at a peak level of the charge sharing correction curve 116, here at a level of the input count rate 112 where a derivative of the output count rate 110 with respect to the input count rate 112 is zero. The count rate threshold value 118 may be set by the control system 14. Since each readout circuit 36 has the same hardware, the count rate threshold value 118 may be the same for all readout circuits 36.

The imaging apparatus 10, such as the control system 14 thereof, may determine the input count rate 112 for each readout circuit 36 based on the non-sharing counted data 94. In case the input count rate 112 is above the count rate threshold value 118, the sharing counted data 88 may be disregarded for that readout circuit 36. This manner constitutes one example of modifying the sharing counted data 88 from the at least one charge sharing correction circuit 82 based on the non-sharing counted data 94 from the non-sharing circuit 90.

The output count rate $CR_{output}$ (or 110) may be determined as:

$$CR_{output} = \frac{C_{nsc}}{t*A} \quad (1)$$

where $C_{nsc}$ is the number of counts counted by the non-sharing circuit 90 (such as the number of counts during a data acquisition period), t is a period of time (such as the data acquisition period), and A is an area of the primary pixel 24 associated with the non-sharing circuit 90. The input count rate 112 may then be determined based on the output count rate no. The input count rate 112 may for example be determined based on a mathematical formula or simulations representing the relationship between the output count rate 110 and the input count rate 112 for the non-sharing circuit 90, i.e. the non-sharing curve 114 in FIG. 8. The input count rate 112 may be determined for one, several or all of the readout circuits 36.

The input count rate 112 for radiation not passing through the object 18 may be substantially higher than the input count rate 112 for radiation passing through the object 18 since fewer X-rays pass through the object 18. The count rate threshold value 118 may thus for example be set such that the input count rate 112 for radiation not passing through the object 18 is above the count rate threshold value 118 and such that the input count rate 112 for radiation passing through the object 18 is below the count rate threshold value 118. In case the sharing counted data 88 from pixels 24 having an input count rate 112 above the count rate threshold value 118 is disregarded, e.g. by the control system 14 during reconstruction, the image processing can be made faster. Moreover, since the radiation not passing through the object 18 may not contain any spectral information of interest, the image processing can be made faster without deteriorating image quality.

Furthermore, by reading out non-sharing counted data 94 from the non-sharing circuit 90 having a lower deadtime than the charge sharing correction circuits 82, the radiation detector 12 is provided with a superior resolution in much higher ranges of input count rates 112, in comparison with conventional radiation detectors comprising one or more charge sharing correction circuits but no non-sharing circuit.

The radiation detector 12 can thus simultaneously handle high input count rates 112 in pixels 24 receiving radiation that has not interacted with the object 18 and provide a high energy resolution by the charge sharing correction in pixels 24 receiving radiation with low input count rates 112 that has interacted with the object 18.

Figure 9:
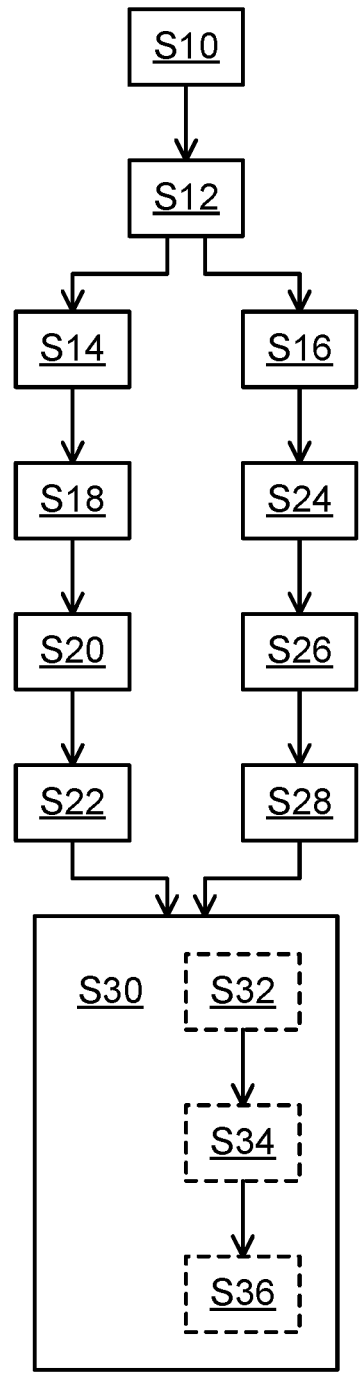
FIG. 9: is a flowchart outlining general steps of a method.

FIG. 9 is a flowchart outlining general steps of a method of handling incident radiation. The method comprises providing S10 a plurality of pixels 24 configured to detect radiation energies of incident radiation. The method further comprises providing S12 a readout circuit 36 configured to handle input signals 42 from a primary pixel 24 with respect to the readout circuit 36 among the plurality of pixels 24. The method further comprises handling S14, by at least one charge sharing correction circuit 82 in the readout circuit 36, a charge sharing electrical signal 56 representative of a sum of radiation energies from a set 26 of pixels 24 among the plurality of pixels 24, the set 26 of pixels 24 comprising at least one secondary pixel 24 with respect to the readout circuit 36. The method further comprises handling S16, by a non-sharing circuit 90 in the readout circuit 36 and simultaneously with the handling S14 of the charge sharing electrical signal 56 by the at least one charge sharing correction circuit 82, a primary electrical signal 70 associated with only the primary pixel 24, the primary electrical signal 70 being representative of radiation energy from the primary pixel 24.

The method of this example further comprises comparing S18, by a sharing comparator 58 in each charge sharing correction circuit 82, the charge sharing electrical signal 56 with a sharing threshold value 60. The method of this example further comprises counting S20, by a sharing counter 62 in each charge sharing correction circuit 82, sharing data 86 associated with the respective sharing comparator 58 to provide sharing counted data 88. The method of this example further comprises handling S22, by a sharing register 64 in each charge sharing correction circuit 82, the sharing counted data 88 from the respective sharing counter 62.

The method of this example further comprises comparing S24, by a non-sharing comparator 66 in the non-sharing circuit 90, the primary electrical signal 70 with a non-sharing threshold value 68. The method of this example further comprises counting S26, by a non-sharing counter 72 in the non-sharing circuit 90, non-sharing data 92 associated with the non-sharing counter 72 to provide non-sharing counted data 94. The method of this example further comprises handling S28, by a non-sharing register 74 in the non-sharing circuit 90, non-sharing counted data 94 from the non-sharing counter 72. In this example, the comparing S18, counting S20 and handling S22 are performed simultaneously with the comparing S24, counting S26 and handling S28.

The method of this example further comprises modifying S30 the sharing counted data 88 based on the non-sharing counted data 94. In this example, the modifying S30 comprises, for each readout circuit 36, determining S32 an output count rate no based on non-sharing counted data 94 from the non-sharing circuit 90, determining S34 an input count rate 112 based on the output count rate no, and disregarding S36 at least some sharing counted data 88 based on the input count rate 112.

Some embodiments include a readout circuit 36 for a radiation detector 12 comprising a plurality of pixels 24, the readout circuit 36 being configured to handle input signals 42 from a primary pixel 24 with respect to the readout circuit 36 among the plurality of pixels 24 and comprising at least one charge sharing correction circuit 82, each charge sharing correction circuit 82 being configured to handle a charge sharing electrical signal 56 representative of a sum of radiation energies from a set 26 of pixels 24 among the plurality of pixels 24, the set 26 of pixels 24 comprising at least one secondary pixel 24 with respect to the readout circuit 36; and a non-sharing circuit 90 configured to handle a primary electrical signal 70 associated with only the primary pixel 24 simultaneously with the handling of the charge sharing electrical signal 56 by the at least one charge sharing correction circuit 82, the primary electrical signal 70 being representative of radiation energy from the primary pixel 24.

The readout circuit 36 may be configured such that the handling of the charge sharing electrical signal 56 by the at least one charge sharing correction circuit 82 is performed simultaneously with the handling of the primary electrical signal 70 by the non-sharing circuit 90. The at least one charge sharing correction circuit 82 and the non-sharing circuit 90 may thus be simultaneously active.

Each pixel 24 may be associated with a unique set 26 of pixels 24. Each set 26 of pixels 24 may have a corresponding relationship between the primary pixel 24 and the at least one secondary pixel 24. Each set 26 of pixels 24 may in addition to the primary pixel 24, comprise a plurality of secondary pixels 24 with respect to the primary pixel 24.

In some embodiments, the non-sharing circuit 90 is arranged to provide non-sharing data 92 and one or more of the at least one charge sharing correction circuit 82 is arranged to provide sharing data 86 in response to a common input signal 42.

In some embodiments, the at least one secondary pixel 24 is neighboring to the primary pixel 24. Two neighboring pixels 24 may be arranged side-by-side or may be diagonally adjacent to each other.

In some embodiments, each charge sharing correction circuit 82 comprises a sharing comparator 58 configured to compare the charge sharing electrical signal 56 with a unique sharing threshold value 60.

In some embodiments, the at least one charge sharing correction circuit 82 comprises a first charge sharing correction circuit 82-1 having a first sharing comparator 58-1 and a second charge sharing correction circuit 82-1 having a second sharing comparator 58-2, wherein the first sharing comparator 58-1 is configured to compare the charge sharing electrical signal 56-1 with a first sharing threshold value 60-1, and wherein the second sharing comparator 58-2 is configured to compare the charge sharing electrical signal 56-2 with a second sharing threshold value 60-2, different from the first sharing threshold value 60-1.

In some embodiments, each charge sharing correction circuit 82 comprises a sharing counter 62 configured to count sharing data 86 associated with the sharing comparator 58.

In some embodiments, each charge sharing correction circuit 82 comprises a sharing register 64 associated with the sharing counter 62 and configured to handle sharing counted data 88 from the associated sharing counter 62.

In some embodiments, each non-sharing circuit 90 comprises a non-sharing comparator 66 configured to compare the primary electrical signal 70 with a non-sharing threshold value 68.

In some embodiments, the non-sharing threshold value 68 may be lower than each sharing threshold value 60.

In some embodiments, each non-sharing circuit 90 comprises a non-sharing counter 72 configured to count non-sharing data 92 associated with the non-sharing comparator 66.

In some embodiments, each non-sharing circuit 90 comprises a non-sharing register 74 associated with the non-sharing counter 72 and configured to handle non-sharing counted data 94 from the associated non-sharing counter 72.

Some embodiments include a radiation detector 12 comprising the plurality of pixels 24 and at least one readout circuit 36 according to the present disclosure, where each readout circuit 36 is associated with a unique pixel 24 among the plurality of pixels 24. The radiation detector 12 may comprise a plurality of readout circuits 36, such as at least 100 readout circuits 36, each associated with a unique pixel 24. The non-sharing threshold values 68 may be the same for all readout circuits 36 and/or each sharing threshold value 60 (e.g. the first sharing threshold value 60-1 and the second sharing threshold value 60-2) may be the same for all readout circuits 36.

In some embodiments, the radiation detector 12 is configured to, for each readout circuit 36, simultaneously read out sharing counted data 88 from the at least one charge sharing correction circuit 82 and non-sharing counted data 94 from the non-sharing circuit 90.

Some embodiments include an imaging apparatus 10 comprising a radiation detector 12 according to the present disclosure.

In some embodiments, the imaging apparatus 10 further comprises a control system 14 including at least one data processing device 20 and at least one memory 22 having at least one computer program stored thereon.

In some embodiments, the at least one computer program comprises program code which, when executed by the at least one data processing device 20, causes the at least one data processing device 20 to modify sharing counted data 88 from one or more of the at least one charge sharing correction circuit 82 based on non-sharing counted data 94 from one or more of the at least one non-sharing circuit 90.

In some embodiments, the at least one computer program comprises program code which, when executed by the at least one data processing device 20, causes the at least one data processing device 20 to, for each readout circuit 36, determine an output count rate 110 based on non-sharing counted data 94 from the non-sharing circuit 90; determine an input count rate 112 based on the output count rate 110; and disregard at least some sharing counted data 88 based on the input count rate 112.

The output count rate 110 may be determined as a number of counts counted by the non-sharing circuit 90 divided by a period of time and divided by an area of the primary pixel 24 associated with the non-sharing circuit 90. The input count rate 112 may then be determined based on the output count rate 110, for example by a mathematical formula or simulation. The input count rate 112 may be determined for one, several or all of the readout circuits 36.

The disregarding of at least some of the sharing counted data 88 may comprise, for each readout circuit 36, disregarding the sharing counted data 88 when the input count rate 112 for that readout circuit 36 is higher than a count rate threshold value 118. The count rate threshold value 118 may be set an input count rate 112 where saturation occurs in at least one of the one or more charge sharing correction circuits 82.

Some embodiments include a method of handling incident radiation, the method comprising providing S10 a plurality of pixels 24 configured to detect radiation energies of incident radiation; providing S12 a readout circuit 36 configured to handle input signals 42 from a primary pixel 24 with respect to the readout circuit 36 among the plurality of pixels 24; handling S14, by at least one charge sharing correction circuit 82 in the readout circuit 36, a charge sharing electrical signal 56 representative of a sum of radiation energies from a set 26 of pixels 24 among the plurality of pixels 24, the set 26 of pixels 24 comprising at least one secondary pixel 24 with respect to the readout circuit 36; and handling S16, by a non-sharing circuit 90 in the readout circuit 36 and simultaneously with the handling S14 of the charge sharing electrical signal 56 by the at least one charge sharing correction circuit 82, a primary electrical signal 70 associated with only the primary pixel 24, the primary electrical signal 70 being representative of radiation energy from the primary pixel 24.

In some embodiments, the method further comprises comparing S18, by a sharing comparator 58 in each charge sharing correction circuit 82, the charge sharing electrical signal 56 with a sharing threshold value 60; counting S20, by a sharing counter 62 in each charge sharing correction circuit 82, sharing data 86 associated with the respective sharing comparator 58 to provide sharing counted data 88; handling S22, by a sharing register 64 in each charge sharing correction circuit 82, the sharing counted data 88 from the respective sharing counter 62; comparing S24, by a non-sharing comparator 66 in the non-sharing circuit 90, the primary electrical signal 70 with a non-sharing threshold value 68; counting S26, by a non-sharing counter 72 in the non-sharing circuit 90, non-sharing data 92 associated with the non-sharing counter 72 to provide non-sharing counted data 94; and handling S28, by a non-sharing register 74 in the non-sharing circuit 90, non-sharing counted data 94 from the non-sharing counter 72.

In some embodiments, the method further comprises modifying S30 the sharing counted data 88 based on the non-sharing counted data 94.

In some embodiments, the method further comprises, for each readout circuit 36, determining S32 an output count rate no based on non-sharing counted data 94 from the non-sharing circuit 90; determining S34 an input count rate 112 based on the output count rate no; and disregarding S36 at least some sharing counted data 88 based on the input count rate 112.

Another aspect of the disclosure relates to a circuit for a radiation detector that comprises a means for reading out input signals 42, 54 from a plurality of pixels 24 in a radiation detector 12, which includes a means for summing radiation energies from a photon pulse from a set 26 of pixels 24 among the plurality of pixels 24; a means for allocating the sum of radiation energies to a primary pixel represented by a charge sharing primary pixel, where the set of pixels includes a secondary pixel; and a means for acquiring radiation energies from the photon pulse from the primary pixel represented by a non-charge sharing primary pixel. The means for acquiring radiation energies from the photon pulse can occur simultaneously with (or at the same time as) the means for summing radiation energies and the means for allocating the sum of radiation energies to a primary pixel. Examples of the means for reading out input signals may comprise at least one readout circuit 36. Examples of the means for summing radiation energies may comprise at least one summer 52, charge sharing correction section 50, and/or at least one charge sharing correction circuit 82. Examples of the means for allocating the sum of radiation energies to a primary pixel may comprise at least one sharing counter 62 and/or sharing register 64. Examples of the means for acquiring radiation energies from the photon pulse from the primary pixel may comprise at least one non-sharing circuit 90, non-sharing counter 72, and/or non-sharing register 74.

In some embodiments, the circuit may further comprise a means for modifying the value of the charge sharing primary pixel based on the value of the non-charge sharing primary pixel. Examples of the means for modifying the value of the charge sharing primary pixel based on the value of the non-charge sharing primary pixel may comprise the control system 14, data processing device 20, memory 22 (and its related program or other stored instructions), related components, and combinations thereof.

One object of the present disclosure is to provide an improved readout circuit. A further object of the present disclosure is to provide an improved radiation detector. A still further object of the present disclosure is to provide an improved imaging apparatus. A still further object of the present disclosure is to provide an improved method of handling incident radiation. These objects are achieved by the disclosed readout circuit, radiation detector, imaging apparatus, and method.

According to a first aspect, there is provided a readout circuit for a radiation detector comprising a plurality of pixels, the readout circuit being configured to handle input signals from a primary pixel with respect to the readout circuit among the plurality of pixels and comprising at least one charge sharing correction circuit, each charge sharing correction circuit being configured to handle a charge sharing electrical signal representative of a sum of radiation energies from a set of pixels among the plurality of pixels, the set of pixels comprising at least one secondary pixel with respect to the readout circuit; and a non-sharing circuit configured to handle a primary electrical signal associated with only the primary pixel simultaneously with the handling of the charge sharing electrical signal by the at least one charge sharing correction circuit, the primary electrical signal being representative of radiation energy from the primary pixel.

According to a second aspect, there is provided a radiation detector comprising the plurality of pixels and at least one readout circuit according to the first aspect, where each readout circuit is associated with a unique pixel among the plurality of pixels.

According to a third aspect, there is provided an imaging apparatus comprising a radiation detector according to the second aspect.

According to a fourth aspect, there is provided a method of handling incident radiation, the method comprising providing a plurality of pixels configured to detect radiation energies of incident radiation; providing a readout circuit configured to handle input signals from a primary pixel with respect to the readout circuit among the plurality of pixels; handling, by at least one charge sharing correction circuit in the readout circuit, a charge sharing electrical signal representative of a sum of radiation energies from a set of pixels among the plurality of pixels, the set of pixels comprising at least one secondary pixel with respect to the readout circuit; and handling, by a non-sharing circuit in the readout circuit and simultaneously with the handling of the charge sharing electrical signal by the at least one charge sharing correction circuit, a primary electrical signal associated with only the primary pixel, the primary electrical signal being representative of radiation energy from the primary pixel.

While the present disclosure has been described with reference to exemplary embodiments, it will be appreciated that the present disclosure is not limited to what has been described above. For example, it will be appreciated that the dimensions of the parts may be varied as needed. Accordingly, it is intended that the present disclosure may be limited only by the scope of the claims appended hereto.

The invention claimed is:

1. A readout circuit for a radiation detector comprising a plurality of pixels, the readout circuit being configured to handle input signals from a primary pixel with respect to the readout circuit among the plurality of pixels and comprising:
    a charge sharing correction circuit, the charge sharing correction circuit being configured to handle a charge sharing electrical signal representative of a sum of radiation energies from a set of pixels among the plurality of pixels, the set of pixels comprising a secondary pixel with respect to the readout circuit; and
    a non-sharing circuit configured to handle a primary electrical signal associated with the primary pixel simultaneously with the handling of the charge sharing electrical signal by the charge sharing correction circuit, the primary electrical signal being representative of a radiation energy from the primary pixel, wherein the non-sharing circuit comprises a non-sharing counter configured to count non-sharing data associated with the non-sharing comparator.

2. The readout circuit according to claim 1, wherein the non-sharing circuit is arranged to provide non-sharing data and the charge sharing correction circuit is arranged to provide sharing data in response to a common input signal.

3. The readout circuit according to claim 1, wherein the secondary pixel is neighboring to the primary pixel.

4. The readout circuit according to claim 1, wherein the charge sharing correction circuit comprises a sharing comparator configured to compare the charge sharing electrical signal with a sharing threshold value.

5. The readout circuit according to claim 4, wherein the charge sharing correction circuit comprises a sharing counter configured to count sharing data associated with the sharing comparator.

6. The readout circuit according to claim 5, wherein the charge sharing correction circuit comprises a sharing register associated with the sharing counter and configured to handle sharing counted data from the sharing counter.

7. The readout circuit according to claim 1, wherein the non-sharing circuit further comprises a non-sharing comparator configured to compare the primary electrical signal with a non-sharing threshold value.

8. The readout circuit according to claim 1, wherein the non-sharing circuit further comprises a non-sharing register associated with the non-sharing counter and configured to handle non-sharing counted data from the non-sharing counter.

9. A radiation detector comprising the plurality of pixels and at least one readout circuit according to claim 1, where each readout circuit is associated with a unique pixel among the plurality of pixels.

10. The radiation detector according to claim 9, wherein the radiation detector is configured to, for each readout circuit, simultaneously read out sharing counted data from the at least one charge sharing correction circuit and non-sharing counted data from the non-sharing circuit.

11. An imaging apparatus comprising a radiation detector according to claim 9.

12. The imaging apparatus according to claim 11, further comprising a control system including at least one data processing device and at least one memory having at least one computer program stored thereon.

13. The imaging apparatus according to claim 12, wherein the at least one computer program comprises program code which, when executed by the at least one data processing device, causes the at least one data processing device to modify sharing counted data from one or more of the at least one charge sharing correction circuit based on non-sharing counted data from one or more of the at least one non-sharing circuit; or
    wherein the at least one computer program comprises program code which, when executed by the at least one data processing device, causes the at least one data processing device to, for each readout circuit:
        determine an output count rate based on non-sharing counted data from the non-sharing circuit;
        determine an input count rate based on the output count rate; and
        disregard at least some sharing counted data based on the input count rate.

14. A method of handling incident radiation, the method comprising:
    providing a plurality of pixels configured to detect radiation energies of incident radiation;
    providing a readout circuit configured to handle input signals from a primary pixel with respect to the readout circuit among the plurality of pixels;
    handling, by a charge sharing correction circuit in the readout circuit, a charge sharing electrical signal representative of a sum of a primary electrical signal associated with the primary pixel and a primary electrical signal associated with a secondary pixel with respect to the readout circuit; and
    handling, by a non-sharing circuit in the readout circuit and simultaneously with the handling of the charge sharing electrical signal by the charge sharing correction circuit, the primary electrical signal associated with only the primary pixel, the primary electrical signal being representative of radiation energy from the primary pixel.

15. The method according to claim 14, further comprising:

comparing, by a sharing comparator in the charge sharing correction circuit, the charge sharing electrical signal with a sharing threshold value;

counting, by a sharing counter in the charge sharing correction circuit, sharing data associated with the sharing comparator to provide sharing counted data;

handling, by a sharing register in the charge sharing correction circuit, the sharing counted data from the sharing counter;

comparing, by a non-sharing comparator in the non-sharing circuit, the primary electrical signal with a non-sharing threshold value;

counting, by a non-sharing counter in the non-sharing circuit, non-sharing data associated with the non-sharing counter to provide non-sharing counted data; and handling, by a non-sharing register in the non-sharing circuit, non-sharing counted data from the non-sharing counter.

16. The method according to claim 15, further comprising modifying the sharing counted data based on the non-sharing counted data.

17. The method according to claim 15, further comprising, for the readout circuit:

determining an output count rate based on non-sharing counted data from the non-sharing circuit;

determining an input count rate based on the output count rate; and disregarding at least some sharing counted data based on the input count rate.

18. A circuit for a radiation detector, comprising:

a readout circuit for reading out input signals from a plurality of pixels in a radiation detector comprising:

a sharing circuit for summing radiation energies from a photon pulse from a set of pixels among the plurality of pixels, the sharing circuit comprising a sharing counter for allocating the sum of radiation energies to a primary pixel represented by a charge sharing primary pixel, wherein the set of pixels includes a secondary pixel; and a non-sharing circuit for acquiring radiation energies from the photon pulse from the primary pixel represented by a non-charge sharing primary pixel simultaneously with the sharing circuit, the non-sharing circuit comprising a non-sharing comparator configured to compare the acquired radiation energies with a non-sharing threshold value.

19. The circuit of claim 18, further comprising:

a data processing device for modifying the value of the charge sharing primary pixel based on the value of the non-charge sharing primary pixel.

* * * * *